US011075511B2

(12) United States Patent
Taylor et al.

(10) Patent No.: US 11,075,511 B2
(45) Date of Patent: Jul. 27, 2021

(54) HAZARDOUS ENVIRONMENT CONDUIT SEALING

(71) Applicant: Eaton Corporation, Cleveland, OH (US)

(72) Inventors: Jesse Wade Taylor, Baldwinsville, NY (US); Andrew Francis Scarlata, West Monroe, NY (US); Joseph M. Manahan, Manlius, NY (US); Richard E. Rothenberger, Syracuse, NY (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 751 days.

(21) Appl. No.: 15/663,113

(22) Filed: Jul. 28, 2017

(65) Prior Publication Data
US 2018/0034256 A1    Feb. 1, 2018

Related U.S. Application Data

(60) Provisional application No. 62/368,611, filed on Jul. 29, 2016.

(51) Int. Cl.
*H02G 15/013* (2006.01)
*H02G 3/04* (2006.01)
*F16L 13/14* (2006.01)
*F16L 57/00* (2006.01)
*H02G 3/06* (2006.01)

(52) U.S. Cl.
CPC ......... *H02G 15/013* (2013.01); *F16L 13/142* (2013.01); *F16L 57/00* (2013.01); *H02G 3/0412* (2013.01); *H02G 3/06* (2013.01)

(58) Field of Classification Search
CPC ...... H02G 15/013; H02G 3/0412; H02G 3/06; F16L 57/00; F16L 13/142
USPC .......................................... 285/294.3, 294.4
See application file for complete search history.

(56) References Cited

U.S. PATENT DOCUMENTS

| 3,893,718 | A  | * | 7/1975  | Powell  | F16L 13/142 |
|           |    |   |         |         | 285/53      |
| 6,012,743 | A  | * | 1/2000  | Godeau  | F16L 31/00  |
|           |    |   |         |         | 285/286.2   |
| 7,592,545 | B2 | * | 9/2009  | Babiarz | F16L 5/02   |
|           |    |   |         |         | 174/76      |
| 8,172,275 | B2 | * | 5/2012  | Sumrall, Jr. | B21K 1/16 |
|           |    |   |         |         | 285/286.1   |
| 8,844,938 | B2 |   | 9/2014  | Brown   |             |
| 9,800,030 | B2 |   | 10/2017 | Morse et al. |        |
| 10,302,230| B2 |   | 5/2019  | Manahan et al. |      |

(Continued)

OTHER PUBLICATIONS

"2014 Code Digest, Article 500-516 of the National Electrical Code® with product recommendations for use in hazardous (classified) areas," Crouse-Hinds by Eaton, 128 pages.

*Primary Examiner* — James M Hewitt, II
(74) *Attorney, Agent, or Firm* — Merchant & Gould P.C.

(57) ABSTRACT

A conduit fitting for a hazardous environment includes a main body that has a distal portion and a proximate portion. The main body includes a longitudinal bore with openings at each of the distal portion and the proximate portion. The opening is configured to receive ends of a conduit. The fitting includes a first sealing region that includes a crimp feature configured to be crimped and a second sealing region adjacent the first sealing region. The second sealing region is configured to house a sealing component.

19 Claims, 9 Drawing Sheets

(56) References Cited

U.S. PATENT DOCUMENTS

| | | | |
|---|---|---|---|
| 2010/0025982 A1* | 2/2010 | Jamison | F16L 21/08 |
| | | | 285/31 |
| 2011/0204624 A1* | 8/2011 | Lawrence | F16L 13/142 |
| | | | 285/345 |
| 2014/0007407 A1* | 1/2014 | Firestine | H02G 3/06 |
| | | | 29/455.1 |
| 2015/0276099 A1* | 10/2015 | Weissmann | F16L 37/0915 |
| | | | 285/179 |
| 2015/0354738 A1* | 12/2015 | Morse | H02G 3/0481 |
| | | | 285/39 |

\* cited by examiner

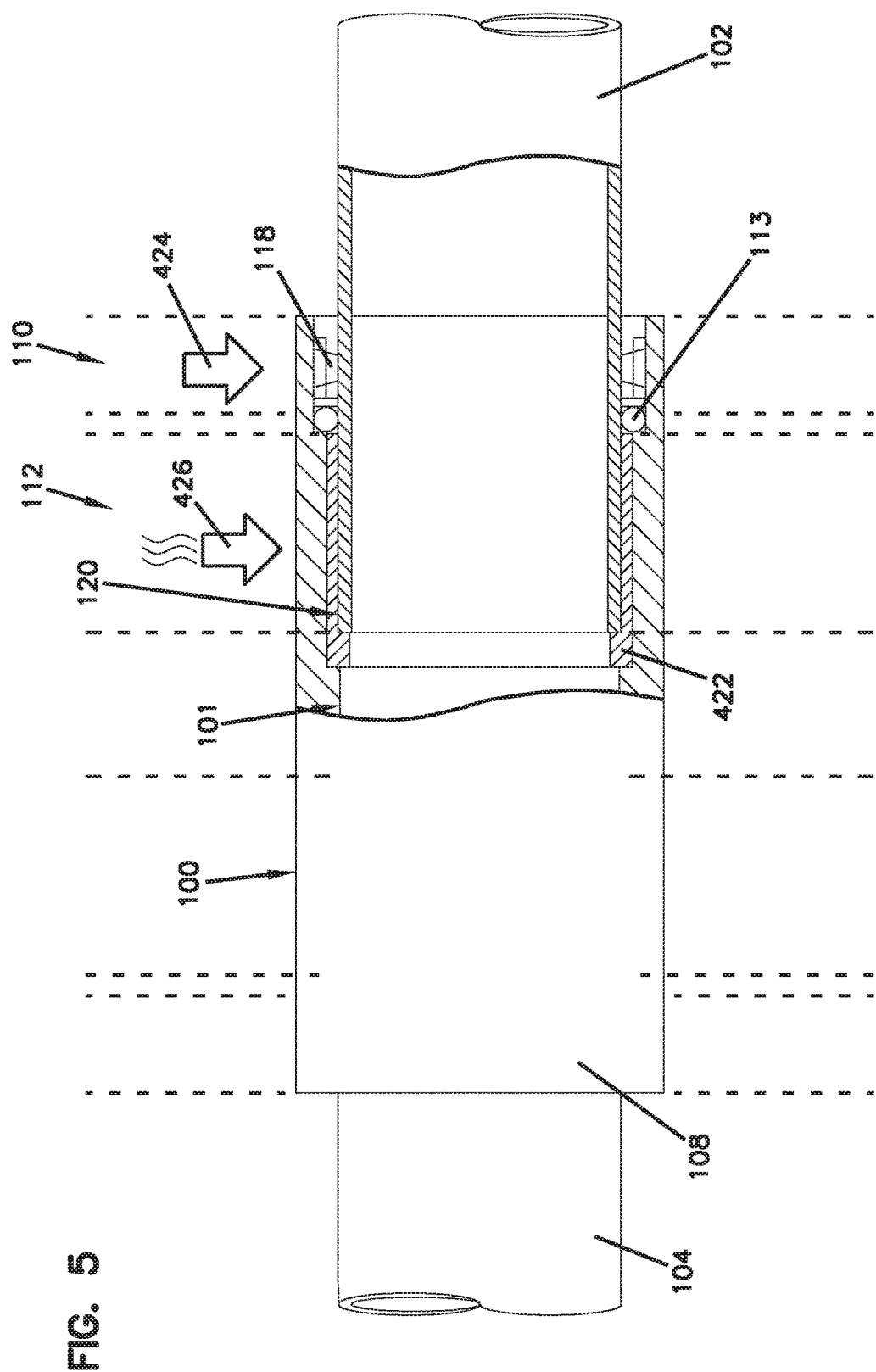

HAZARDOUS ENVIRONMENT CONDUIT SEALING

CROSS REFERENCE TO RELATED APPLICATIONS

This application claims the benefit of provisional application Ser. No. 62/368,611, filed Jul. 29, 2016, which is incorporated herein by reference in its entirety.

BACKGROUND

When installing electrical components in hazardous environments, particular precautions must be taken to ensure a safe work environment. Hazardous environments are environments that may include ignitable or combustible gas, vapor, dust, or fiber. Due to the potential ignition risk of any electrical components within the hazardous environment, conduits are often used to protect and isolate such components within the environment. Because of this, conduit and conduit connections need to be sealed from the hazardous environment to reduce the potential for a fire or explosion. Specifically, the Standard "UL 1203," along with other standards, set forth criteria for explosion proof electrical equipment for use in hazardous environments such as requiring mating surfaces to utilize threaded joints, controlled flat or labyrinth joints, or cemented or bonded joints. However, the conduit that is used is often imperfect as it is commonly extruded or welded tubing that is not a high tolerance part. Dimensional variation along the length and perimeter of the conduit are common and such defects affect the ability for the conduit to comply with flame-path requirements. Often, threaded joints are commonly used due to the round shape of the conduit and the proven effectiveness of a threaded joint. However, creating a sealed conduit connection can be cumbersome and time consuming. Therefore, improvements in sealing conduit connections are needed, particularly in field-created joining methods for improvements in system safety, reliability, and installation time.

SUMMARY

The present disclosure relates generally to sealing conduit connections within hazardous environments in the field. In one possible configuration, and by non-limiting example, sealing is accomplished by using a fitting with at least one crimp region and at least one sealant medium.

In a first aspect of the present disclosure, a conduit fitting is disclosed. The conduit fitting for a hazardous environment includes a main body that has a distal portion and a proximate portion. The main body includes a longitudinal bore with openings at each of the distal portion and the proximate portion. The opening is configured to receive ends of conduit. The fitting includes a first sealing region that includes a crimp feature configured to be crimped and a second sealing region adjacent the first sealing region. The second sealing region is configured to house a sealing component. In some examples, the first and second sealing regions are configured to create an explosion proof seal around an end of the conduit.

In a second aspect of the present disclosure, a method of securing a fitting to a conduit portion in a hazardous environment is disclosed. The method includes providing a fitting that includes a main body that has a distal end and a proximate end. The main body includes a longitudinal bore with openings at each of the distal end and the proximate end, and the openings are configured to receive ends of the conduit. The fitting also includes a first sealing region and a second sealing region adjacent the first sealing region. The method includes inserting a first end of the conduit into an opening of the main body of the fitting and providing a sealing component between the fitting and the conduit at the second sealing region. The method also includes crimping the first sealing region around the conduit and providing an explosion proof seal between the fitting and the conduit.

A variety of additional aspects will be set forth in the description that follows. The aspects can relate to individual features and to combinations of features. It is to be understood that both the foregoing general description and the following detailed description are exemplary and explanatory only and are not restrictive of the broad inventive concepts upon which the embodiments disclosed herein are based.

BRIEF DESCRIPTION OF THE DRAWINGS

The following drawings are illustrative of particular embodiments of the present disclosure and therefore do not limit the scope of the present disclosure. The drawings are not to scale and are intended for use in conjunction with the explanations in the following detailed description. Embodiments of the present disclosure will hereinafter be described in conjunction with the appended drawings, wherein like numerals denote like elements.

FIG. 5 illustrates a side view of a conduit connection utilizing the conduit fitting of FIG. 1 and an expanding heat activated seal, according to one embodiment of the present disclosure;

DETAILED DESCRIPTION

Figure 1:
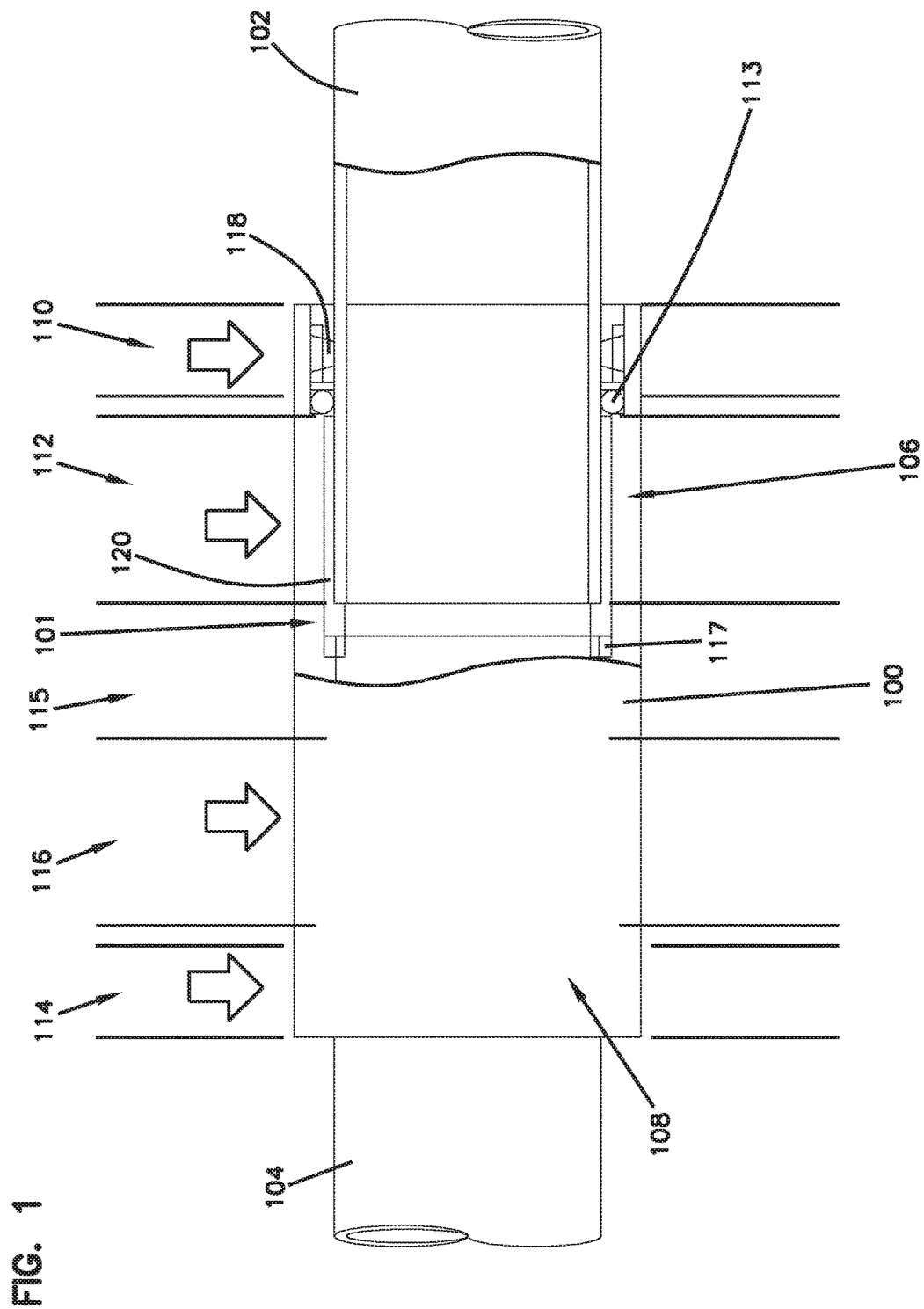
FIG. 1 illustrates a side view of a hazardous environment conduit fitting, according to one embodiment of the present disclosure.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

The sealing solutions disclosed herein have several advantages. Specifically, the sealing solutions do not require that the ends of conduit be threaded for connection with a threaded joint in a hazardous environment. This is advantageous as the sealing solutions described herein can be completed in less time by the installer and can also be performed in a smaller space. Further, the sealing solutions described herein create an explosion proof conduit connection that meets UL 1203 and/or CSA 22.2 #30 is yet another example. In some examples, the sealing solutions described herein create an explosion proof conduit connection by one of a pressure sensitive adhesive, a flowable epoxy, a heat activated thermoplastic, a two component epoxy, a flame-path, or a pressure activated epoxy. In other examples, the sealing solutions described herein create a conduit connection that can be used in a variety of environments, and not necessary just hazardous environments. In some examples, the sealing solutions described herein create a conduit connection that is a sealed connection and not explosion proof.

FIG. 1 shows a conduit fitting 100 connecting a first conduit end 102 and a second conduit end 104 forming a conduit connection. The fitting 100 is configured to form an explosion proof conduit connection for use in a hazardous environment. The fitting 100 includes a central bore 101, a first end 106 and a second end 108. In the depicted embodiment, a cutaway of the first end 106 is shown for illustration purposes.

The central bore 101 continues longitudinally through the fitting 100 from the first end 106 to the second end 108. In some embodiments, the central bore 101 can be stepped to accommodate a plurality of different sealing configurations. Further, the central bore 101, and fitting 100 in general, can be sized to accommodate a wide range of conduit sizes that are commonly used within hazardous environments. In some embodiments, the diameter of the central bore is about, but not limited to, 0.5 to 6.0 inches.

The first end 106 includes a first region 110 and a second region 112. The first and second regions 110, 112 are configured to receive heat treatment or compression force by a crimping wrench (not shown). In the depicted embodiment, the first end 106 optionally includes an O-ring 113 positioned within the fitting 100 between the first and second regions 110, 112.

The second end 108 includes a third region 114 and a fourth region 116. The third and fourth regions are substantially similar to the first and second regions 110, 112 and are also configured to receive heat treatment or compression force. In some embodiments, the second end 108 is substantially identical to the first end 106. In some embodiments, the second end 108 also includes an O-ring (not shown) positioned within the fitting 100 between the third and fourth regions 114, 116.

In some embodiments, at a region 115 generally between the first and second ends 106, 108 an internal bushing 117 may be located in the central bore 101. The internal bushing 117 can function as a positive stop for the conduit and generally has an inner diameter smaller than that of the central bore 101 of the fitting 100 and the conduit.

In the cutaway region at the first end 106, the first conduit end 102 is shown positioned within the central bore 101 of the fitting 100. Specifically, the first conduit end 102 is positioned and aligned with the first and second regions 110, 112.

The first region 110 is shown to include crimping features 118 that are configured to engage the first conduit end 102 when a force is applied at the first region by a crimping tool. In the depicted embodiment, the crimping features 118 are a plurality of teeth positioned on the interior portion of the fitting 100 at the first region 110. The teeth will bite into the first conduit end 102 when the first region 110 is compressed. The crimping features 118 can help aid in axial retention of the first conduit end 102 within the fitting 100, and in maintaining a ground connection.

The second region 112 is shown to include a void 120 between the central bore 101 and the first conduit end 102. The void 120 is configured to receive a plurality of different sealing components, as described herein. In some embodiments, the second region 112 can also include a crimp feature similar the crimp feature 118 of the first region 110.

Figure 2:
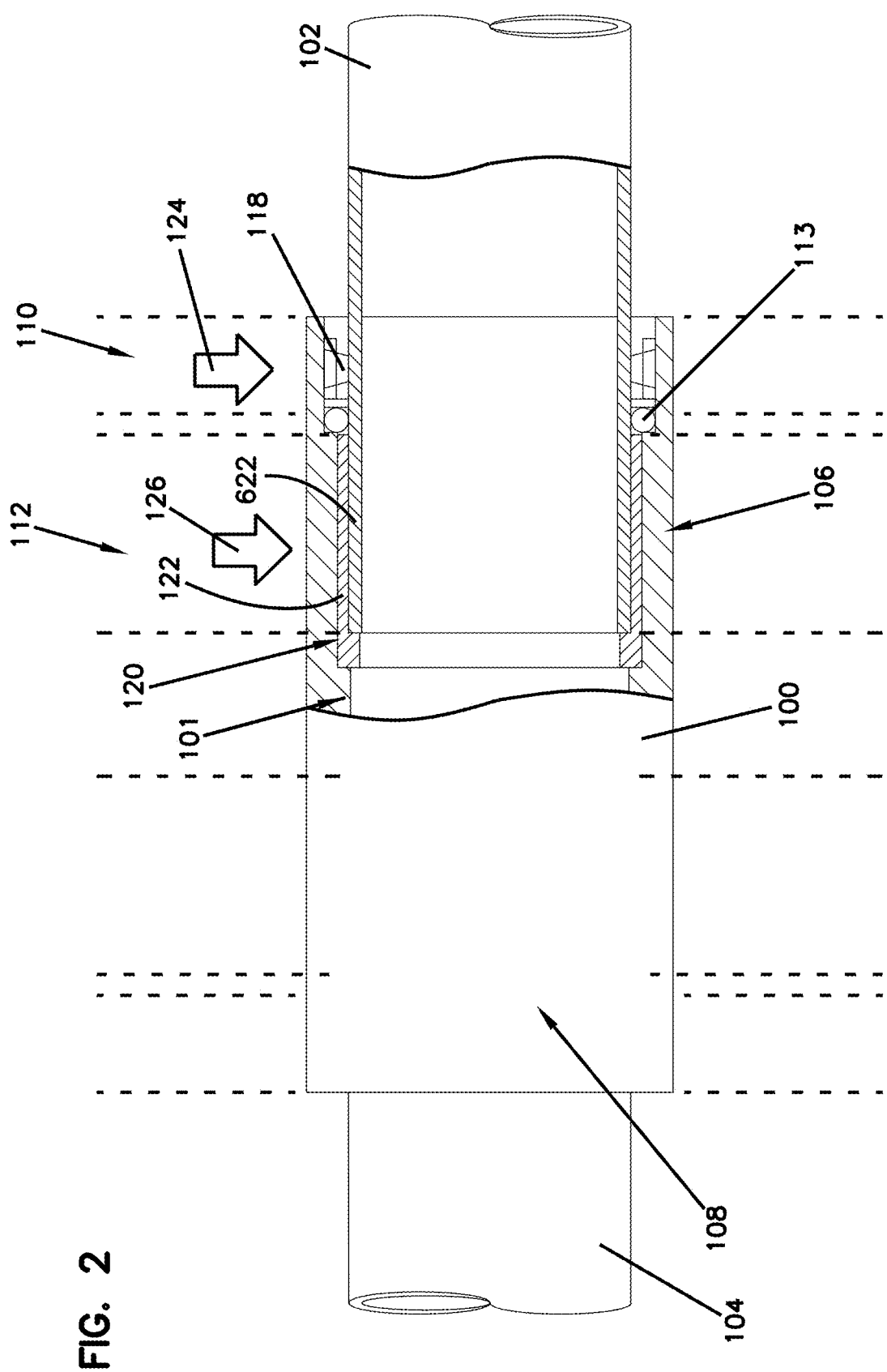
FIG. 2 illustrates a side view of a conduit connection utilizing the conduit fitting of FIG. 1 and a pressure sensitive adhesive, according to one embodiment of the present disclosure.

FIG. 2 shows the fitting 100 and a sealing solution according to one embodiment of the present disclosure. In the depicted embodiment, the void 120 between the second region 112 and the first conduit end 102 includes a pressure sensitive adhesive ("PSA") 122. The PSA 122 fills the void 120 completely to form a seal between the central bore 101, specifically at the second region 112, and the first conduit end 102, thereby forming a cemented joint between the fitting 100 and the first conduit end 102. In some embodiments, the second conduit end 104 can be sealed with the fitting 100 in a substantially similar manner as the first conduit end 102.

The PSA 122 can be a continuous flexible strip of cloth, paper, metal, plastic, or foam that is coated on one or both sides with an adhesive. The PSA 122 is configured to adhere to the first conduit end 102 and/or central bore 101 of the fitting 100 with pressure. In some embodiments, the PSA 122 can be a blend of natural or synthetic rubber and resin, acrylic, silicone, or other polymer, with or without additives.

Figure 8:
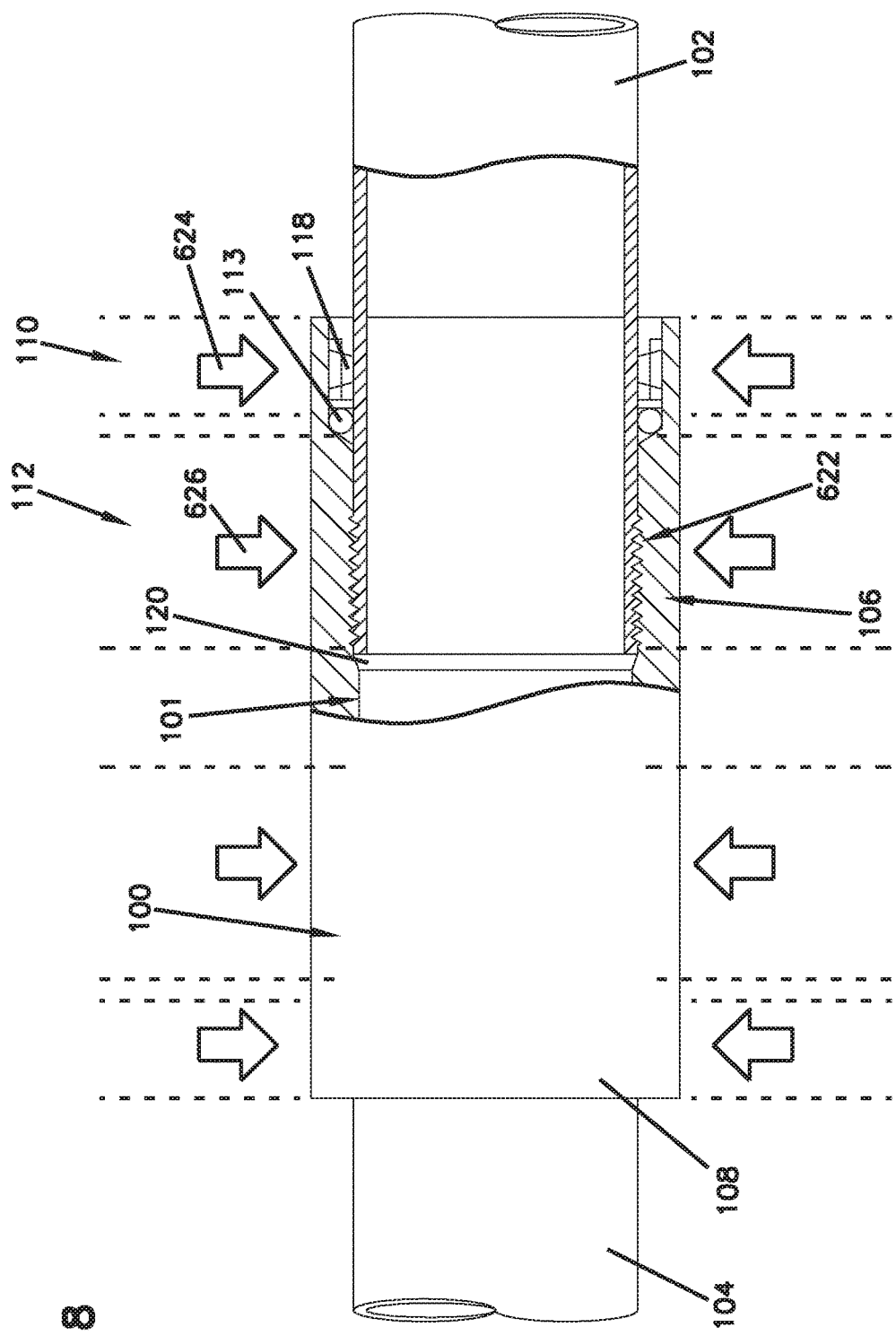
FIG. 8 illustrates a side view of a conduit connection utilizing the conduit fitting of FIG. 1 and a helical flame path, according to one embodiment of the present disclosure.
Figure 9:
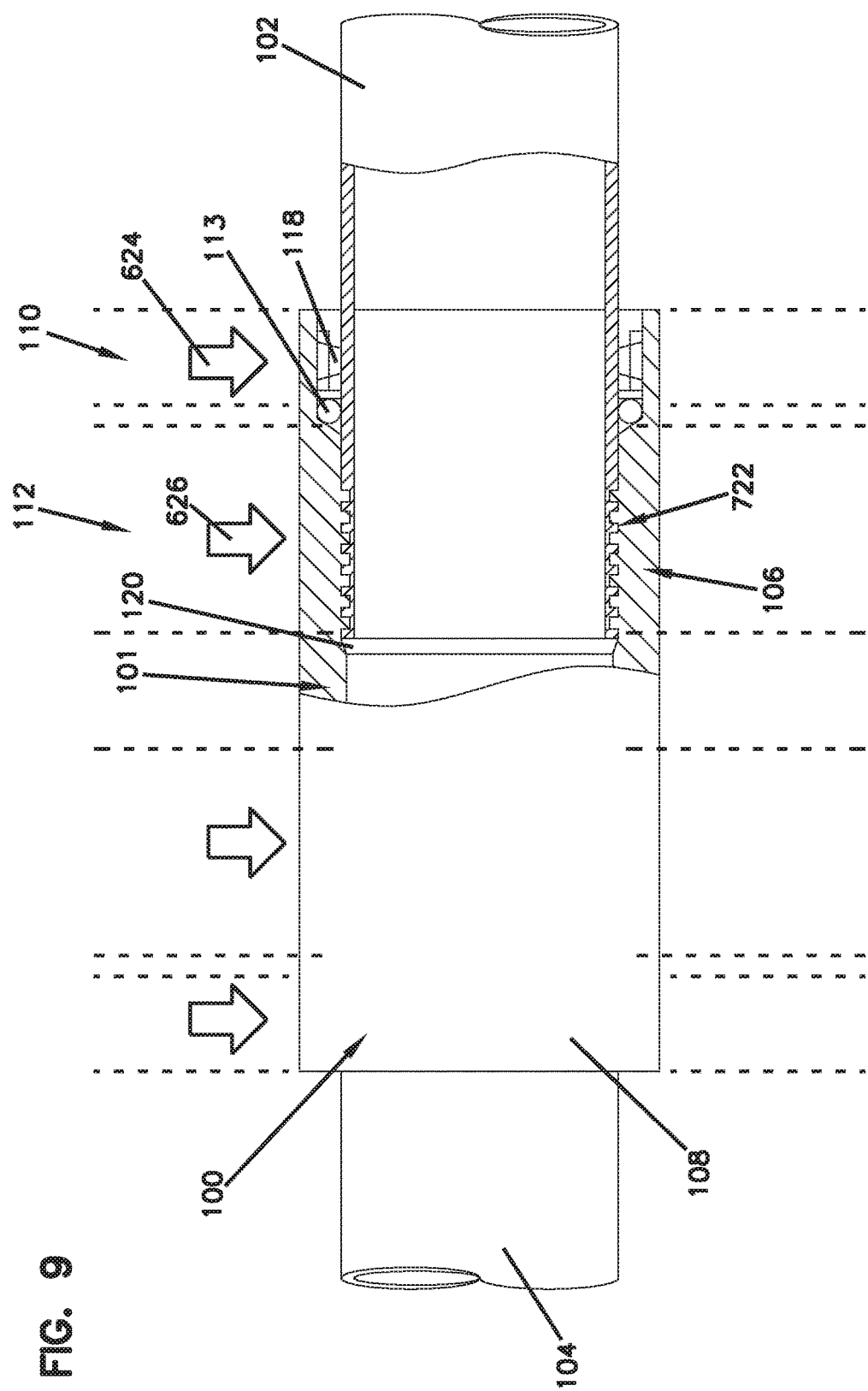
FIG. 9 illustrates a side view of a conduit connection utilizing the conduit fitting of FIG. 1 and a labyrinth flame path, according to one embodiment of the present disclosure.

In some embodiments, the PSA 122 is installed into the central bore 101 of the fitting 100 prior to inserting the first conduit end 102 into the fitting 100. In other embodiments, the PSA 122 is wrapped around the first conduit end 102 prior to inserting the first conduit end 102 into the fitting 100. A first crimping force 124 and a second crimping force 126 are then exerted by the installer at both the first and second regions 110, 112, respectively. The first crimping force 124 compresses the fitting 100 and engages the crimping features 118 with the first conduit end 102. The second crimping force 126 compresses the fitting 100 around the PSA 122, sandwiching the PSA 122 between the central bore 101 of the fitting 100 and the first conduit end 102 to create a cemented joint for a hazardous environment. As shown in FIGS. 8 and 9, the second crimping force 126 can additionally create a flame path 622, 722 in the second region 112 of the fitting 100. The PSA 122 allows the installer to quickly seal the conduit connection, while using a relatively low cost sealant.

Figure 3:
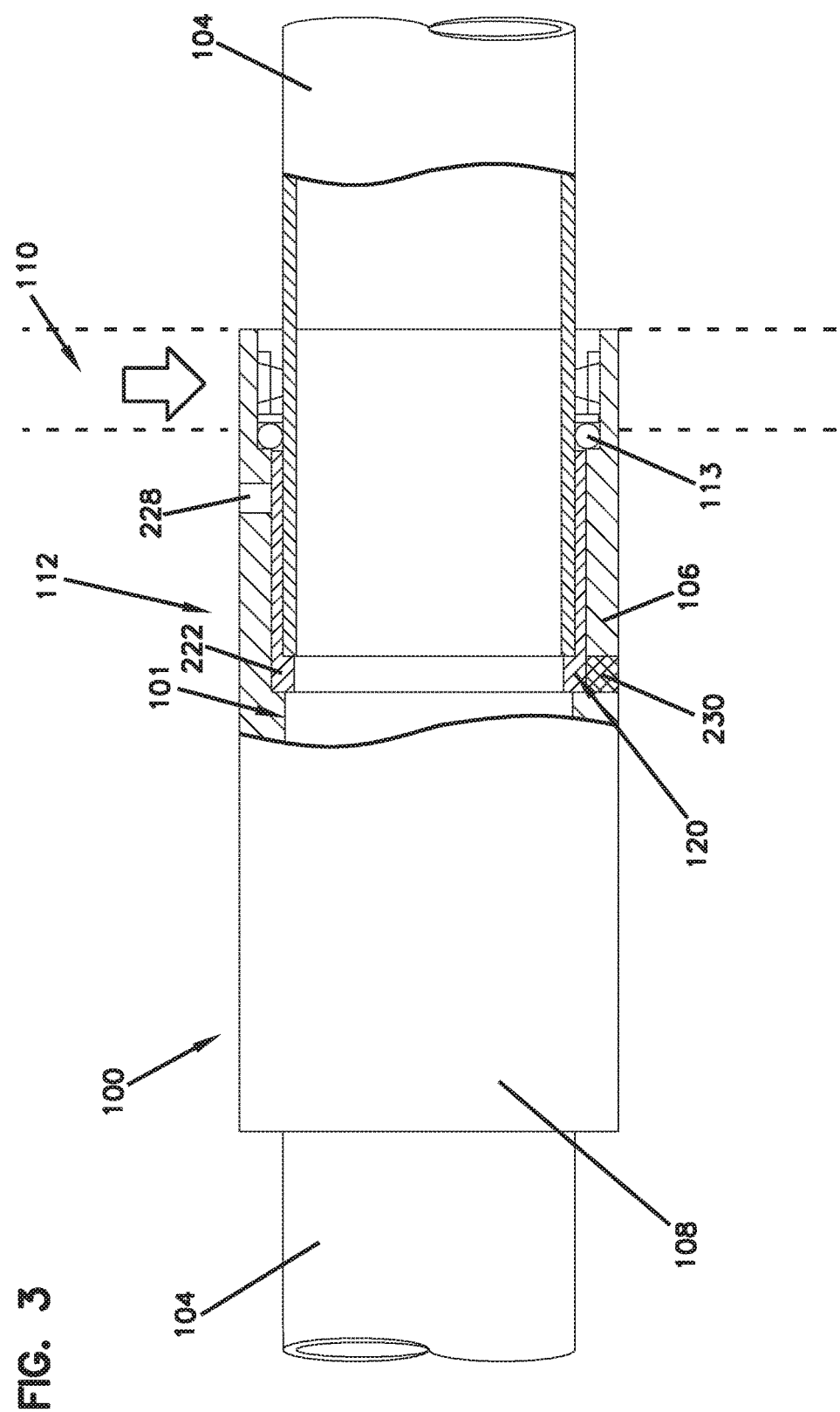
FIG. 3 illustrates a side view of a conduit connection utilizing the conduit fitting of FIG. 1 and an injectable sealant, according to one embodiment of the present disclosure.

FIG. 3 shows the fitting 100 and a sealing solution according to one embodiment of the present disclosure. In the depicted embodiment, the void 120 between the second region 112 and the first conduit end 102 includes an injectable sealant 222. Like the PSA 122, the injectable sealant 222 fills the void 120 completely to form a cemented seal between the central bore 101 and first conduit end 102, specifically at the second region 112. In some embodiments, the second conduit end 104 can be sealed with the fitting 100 in a substantially similar manner as the first conduit end 102.

In the depicted embodiment, the fitting 100 includes an injection port 228 to allow the injectable sealant 222 to be inserted from the outside of the fitting 100 into the void 120. In some embodiments, the fitting 100 can also include a weep port 230 that permits the installer to visibly see when the void 120 has been completely filled with sealant. In some embodiments, the weep port 230 is positioned at the opposite side of the fitting 100 from the injection port 228.

The injectable sealant 222 can be a flowable epoxy of a variety of different types. For example, the injectable sealant 222 can be a two-part epoxy (also referred to as "two component epoxy" or "2K epoxy") that the installer can mix on site. In other examples, the injectable sealant 222 is a polyurethane substance that expands to sealant foam. In some embodiments, the injectable sealant 222 can at least partially cure very quickly, offering the installer a cemented joint in a short amount of time.

In some embodiments, the injectable sealant 222 is injected into the central bore 101 of the fitting 100 via the injection port 228 after inserting the first conduit end 102 has been positioned in the fitting 100. After injecting a set amount of sealant, or receiving confirmation from the weep port 230 that enough sealant has been injected, the installer applies a first crimping force 224 at the first region 110. In some embodiments, the installer may also treat the second region 112 with heat to increase the curing speed of the injectable sealant 222. Once cured, the injectable sealant 222 fills the void 120 between the central bore 101 of the fitting 100 and the first conduit end 102 to create a cemented joint for a hazardous environment. The injectable sealant 222 allows the installer to quickly seal the conduit connection, while using a relatively low cost sealant.

Figure 4:
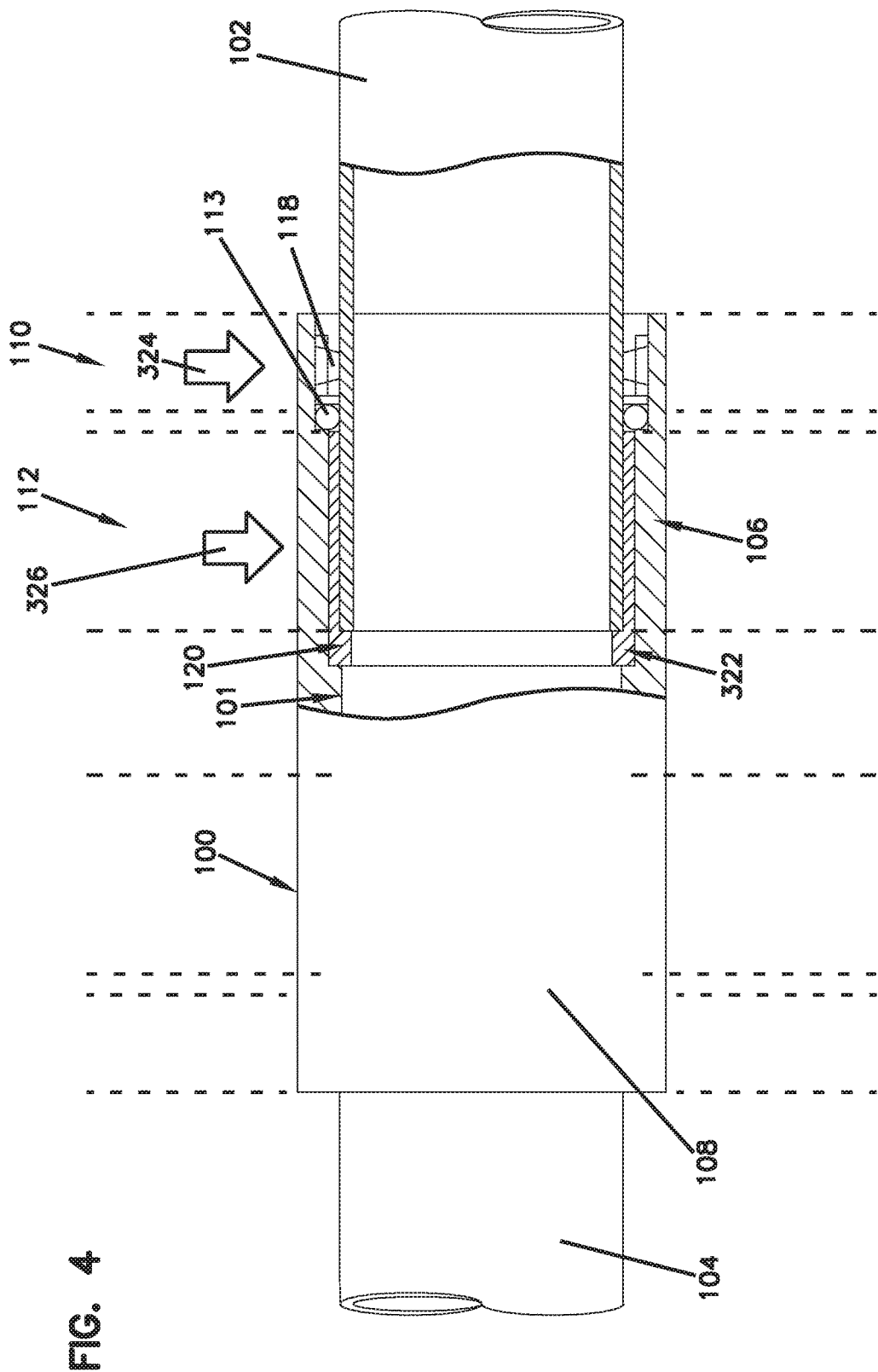
FIG. 4 illustrates a side view of a conduit connection utilizing the conduit fitting of FIG. 1 and a microcapsule matrix seal, according to one embodiment of the present disclosure.
Figure 7:
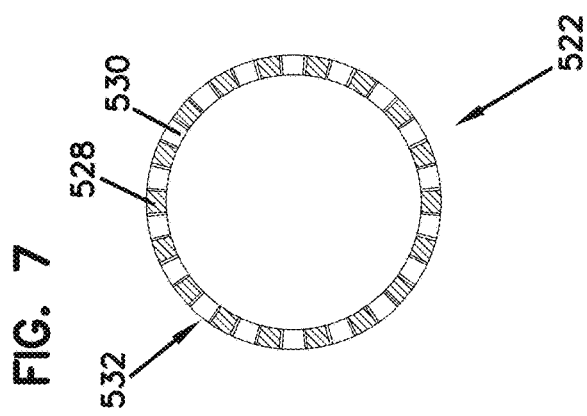
FIG. 7 illustrates a front view of the chambered seal of FIG. 6.

FIG. 4 shows the fitting 100 and a sealing solution according to one embodiment of the present disclosure. In the depicted embodiment, the void 120 between the second region 112 and the first conduit end 102 includes a pressure activated microcapsule matrix 322. The microcapsule matrix 322 fills the void 120 completely to form a seal between the central bore 101 and the first conduit end 102, specifically at the second region 112. The microcapsule matrix 322 forms a cemented joint between the fitting 100 and the first conduit end 102. In some embodiments, the second conduit end 104 can be sealed with the fitting 100 in a substantially similar manner as the first conduit end 102.

The microcapsule matrix 322 can be positioned within the central bore 101 of fitting 100 and can be dry and non-tacky to the touch. The microcapsule matrix 322 comprises a dried first substance and a plurality of material-filled microcapsules. Applying pressure ruptures the microcapsules causing the material contained within to be released. Once such material mixes with either the dried first substance of other encapsulated materials, the matrix 322 becomes a wet, flowable adhesive. In one embodiment, the microcapsule matrix 322 can be a foaming polyurethane or an epoxy.

In some embodiments, the microcapsule matrix 322 is installed into the central bore 101 of the fitting 100 when the fitting 100 is manufactured, prior to the fitting reaching the installer. In other embodiments, the installer can treat the fitting 100 or the first conduit end 102 at the site with the microcapsule matrix 322 in the form of a spray, tape, or similar coating. A first crimping force 324 and a second crimping force 326 are then exerted by the installer at both the first and second regions 110, 112, respectively. In some embodiments, the first and second crimping forces may be exerted at both the first and second regions 110, 112 at the same time by either a single tool or multiple tools. Similar to above, the first crimping force 324 compresses the fitting 100 and engages the crimping features 118 with the first conduit end 102, and the second crimping force 326 compresses the fitting 100 around the microcapsule matrix 322. Such compression breaks the microcapsules within the matrix 322, and allows the matrix 322 to create seal that creates a cemented joint for a hazardous environment. The microcapsule matrix 322 allows the installer to quickly seal the conduit connection.

FIG. 5 shows the fitting 100 and a sealing solution according to one embodiment of the present disclosure. In the depicted embodiment, the void 120 between the second region 112 and the first conduit end 102 includes an expanding heat activated seal 422. Similar to above, the heat activated seal 422 fills the void 120 completely to seal the central bore 101, specifically at the second region 112, forming a cemented joint between the fitting 100 and the first conduit end 102. In some embodiments, the second conduit end 104 can be sealed with the fitting 100 in a substantially similar manner as the first conduit end 102.

The heat activated seal 422 can be positioned within the central bore 101 of fitting 100, either from the factory or installed within the fitting 100 by the installer, similar to the PSA 122 and microcapsule matrix 322. The heat activated seal 422 can be a thermoplastic matrix that is voided to entrap gas. When heat is applied, the gas expands and also expands the seal 422.

Once the heat activated seal 422 positioned within the fitting 100 at the second region 112, and the first conduit end 102 is inserted into the fitting 100, a first crimping force 424 is exerted by the installer at the first region 110. Similar to above, the first crimping force 424 compresses the fitting 100 and engages the crimping features 118 with the first conduit end 102. A localized controlled heat source 426 (e.g., from a resistive heater) is then applied at the second region 112 to activate the seal 422. In some embodiments, after heat is applied, the second region can then also be cooled to solidify the seal 422 faster. Once solid, the heat activated seal 422 creates a cemented joint for a hazardous environment. The heat activated seal 422 allows the installer to quickly seal the conduit connection and is also rugged and chemical resistant.

Figure 6:
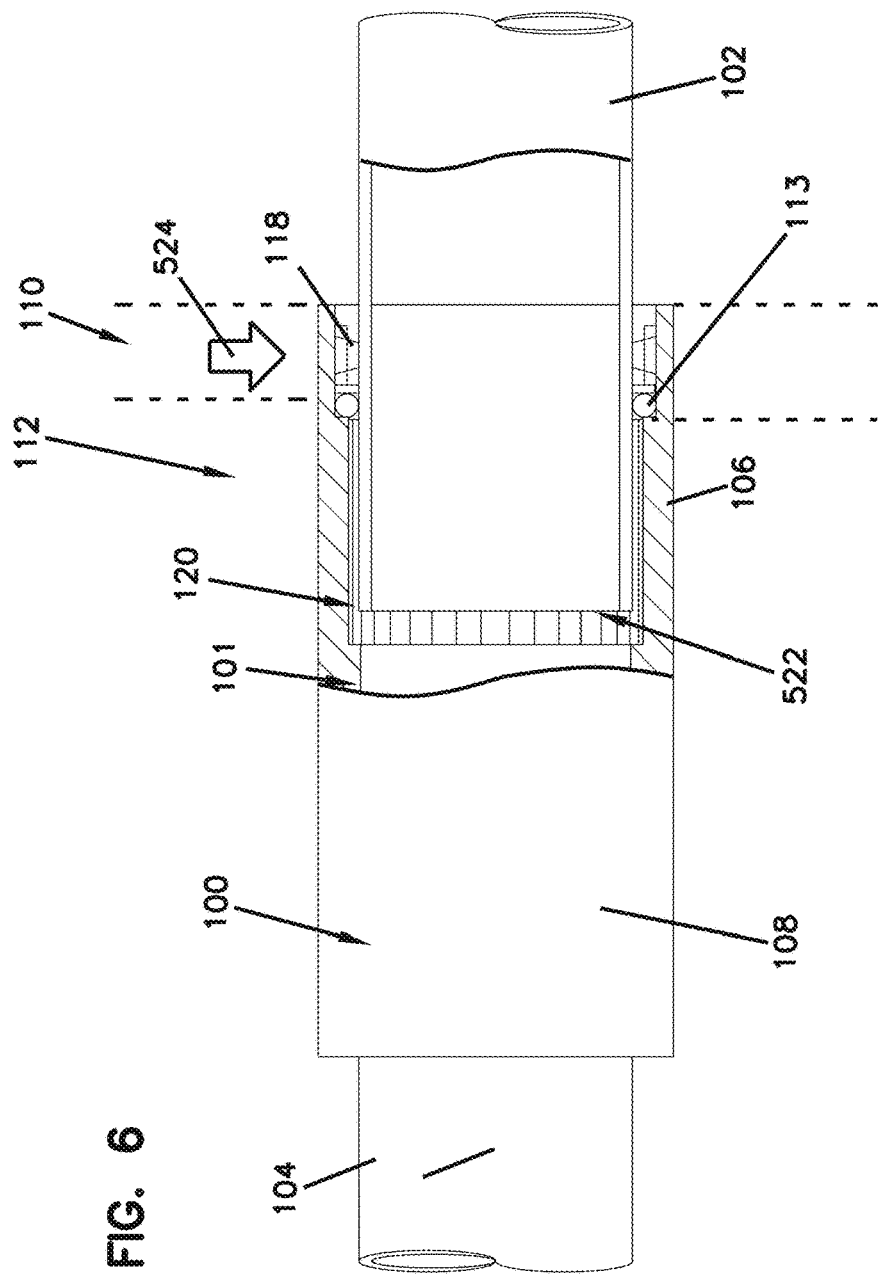
FIG. 6 illustrates a side view of a conduit connection utilizing the conduit fitting of FIG. 1 and a chambered seal, according to one embodiment of the present disclosure.

FIG. 6 shows the fitting 100 and a sealing solution according to one embodiment of the present disclosure. In the depicted embodiment, the void 120 between the second region 112 and the first conduit end 102 includes a chambered seal 522. The chambered seal 522 fills the void 120 completely to form a seal between the central bore 101 and the fitting 100, specifically at the second region 112, forming a cemented joint between the fitting 100 and the first conduit end 102. In some embodiments, the second conduit end 104 can be sealed with the fitting 100 in a substantially similar manner as the first conduit end 102.

The chambered seal 522 can be positioned within the central bore 101 at the second region 112 of fitting 100, either from the factory or installed within the fitting 100 by the installer. The chambered seal 522 includes a first component 528 and a second component 530, each individually sealed from one another in separate chambers 532. The components 528, 530 can be similar to the components that make up the injectable sealant 222 and can form a two component, or 2k, epoxy when mixed with one another. When the first and second components 528, 530 are mixed with one another, they create a flowable epoxy that expands in volume, and fills the void 120 and creates a seal around the first conduit end 102. To mix the components 528, 530 together, the chambered seal 522 can include a rip cord (not shown) or similar feature that allows the components 528, 530 to mix. In some embodiments, the central bore 101 of the fitting 100 includes a feature to break open the chambered seal 522 such as knives or blades. In some embodiments, the chambers 532 are broken by spinning either the fitting 100 or the first conduit end 102 about each other. In some embodiments, the fitting 100 includes a weep port, similar to the weep port 230, to allow the installer to know when the void 120 has been completely filled by the seal 522.

Once the chambered seal 522 is positioned within the fitting 100 at the second region 112 and the first conduit end 102 is inserted into the fitting 100, a first crimping force 524 is exerted by the installer at the first region 110. Similar to above, the first crimping force 524 compresses the fitting 100 and engages the crimping features 118 with the first conduit end 102. The installer then breaks the chambers 532 of the chambered seal 522 to mix the components 528, 530. In some embodiments, the installer can then check a weep port to ensure that the chambered seal 522 has created a seal between the fitting 100 and the first conduit end 102. Like the seals described above, once cured, the chambered seal 522 creates a cemented joint for a hazardous environment that allows the installer to quickly seal the conduit connection and is also rugged and chemical resistant.

FIG. 8 shows the fitting 100 and a sealing solution according to one embodiment of the present disclosure. In the depicted embodiment, the void 120 between the second region 112 and the first conduit end 102 includes a first flame path 622, or, as shown in FIG. 9, a second flame path 722. The first and second flame path 622, 722 operate in a similar manner and will be discussed herein concurrently. The flame paths 622, 722 can be created within the fitting by exerting a compression force at the second region 112 of the fitting 100. The flame paths 622, 722 create an explosion-proof joint between the first conduit end 102 and the fitting 100. In some embodiments, the second conduit end 104 can be sealed with the fitting 100 in a substantially similar manner as the first conduit end 102.

The flame paths 622, 722 provide a path for explosion gasses to the escape the conduit and fitting 100. By creating a varied path for the gas to travel, the gas from any explosion that occurs within the fitting 100 or conduit is cooled and allowed to leave the fitting. This keeps the hot flaming gas retained within the fitting 100 and conduit, reducing the possibility of a larger explosion in the hazardous environment outside of the conduit and fitting 100. In FIG. 8, the flame path 622 is shown to be helically shaped, similar to a threaded surface. In FIG. 9, the flame path 722 is shown to be a labyrinth-shaped flame path. In other embodiments, the flame paths 622, 722 can be a cylindrical shape or other shape that allows gasses to cool and escape the conduit connection. In some embodiments, the flame paths can 622, 722 can be pre-formed within the fitting 100.

During installation, the installer first places the first conduit end 102 into the fitting 100. Similar to above, a first crimping force 624 compresses the fitting 100 and engages the crimping features 118 with the first conduit end 102. The installer then creates the flame path 622, 722 by exerting a second compression force 626 at the second region 112 of the fitting. The second compression force 626 generates and creates the flame path 622, 722. In some embodiments, the void 120 is only partially closed to allow for a flame path.

In some examples, a flame path 622, 722 can be used in addition to the one or more sealing solutions described above in connection with FIGS. 1-7. For example, the fitting 100 can include a pressure sensitive adhesive, a flowable epoxy, a heat activated thermoplastic, a two component epoxy, and/or a pressure activated epoxy along with a flame path 622, 722 within the same fitting 100. In some examples, the flame path 622, 722 and pressure sensitive adhesive, flowable epoxy, heat activated thermoplastic, two component epoxy, and/or a pressure activated epoxy are positioned within the void 120 along with the flame path 622, 722. In other examples still, the sealing solutions described in connection with FIGS. 1-7 can be used in a system that includes a flame path elsewhere in the system, such as upstream, or downstream from the fitting. In other examples, a series of fittings 100 with different sealing solutions can be used together in a system. For example, a system can include a fitting utilizing a pressure sensitive adhesive, a flowable epoxy, a heat activated thermoplastic, a two component epoxy, and/or a pressure activated epoxy and an additional fitting 100 utilizing a flame path 622, 722.

Figure 10:
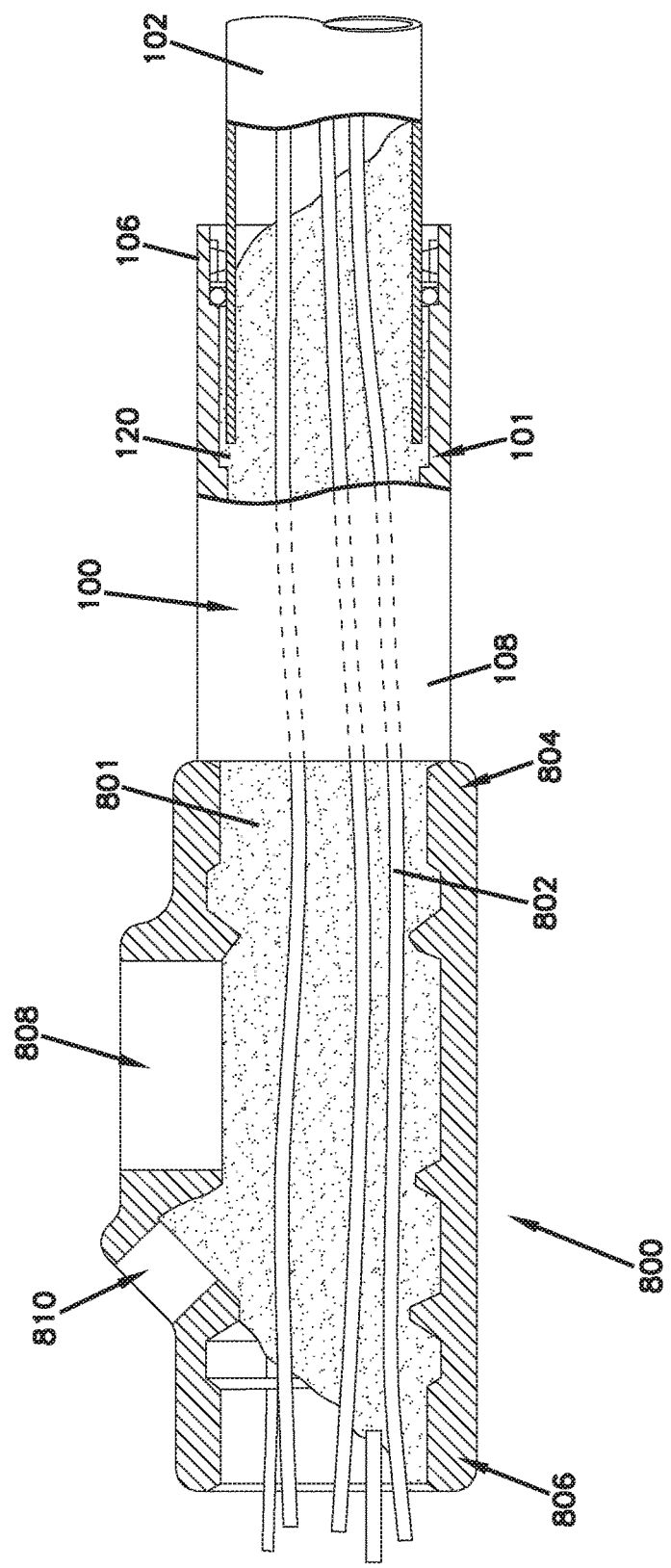
FIG. 10 illustrates a side view of a conduit connection utilizing the conduit fitting of FIG. 1 and a sealant adaptor, according to one embodiment of the present disclosure.

FIG. 10 shows the fitting 100 used with a sealing adaptor 800 to seal the inside of the fitting 100 and conduit. As shown, the adapter 800 is mated with the second end 108 of the fitting 100, opposite of the first end 106 where the first conduit end 102 is inserted into the fitting 100. In some embodiments, the adapter 800 is press-fit, threaded, or cast into, and as part of, the fitting 100. As shown, electrical components 802, such as conductors, are shown positioned within the first conduit end 102, fitting 100, and adapter 800.

The adapter 800 is configured to allow the installer to apply a flowable sealant 801 into the central bore 101 of the fitting 100 to seal the first conduit end 102 to the fitting 100, seal the adaptor 800 to the fitting 100, and seal the conductors 802 to the fitting 100. The adapter 800 includes a first end 804, a second end 806, a first port 808, and a second port 810. At the first end 804, the adapter 800 is attached to the fitting 100. In some embodiments, the second end 806 of the adapter 800 is connected to an additional fitting or an additional end of a conduit.

The first port 808 of the adapter 800 is configured to receive the sealant 801 when the adapter is in a generally horizontal positon (as shown). This ensures that the sealant 801 seeps into and coats the fitting 100, first conduit end 102, and adaptor 800. The sealant 801 then also adheres to the conductors 802 and seals them to the fitting 100. The second port 810 operates in a similar manner as the first port 808; however, it is configured to be used when the adaptor 800 is oriented in a more vertical position.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

We claim:

1. A conduit fitting for a hazardous environment comprising:
   a main body having a distal portion and a proximate portion, the main body including a longitudinal bore with openings at each of the distal portion and the proximate portion, the opening at the proximal portion being configured to receive an end of a conduit;
   a first sealing region on the proximal portion including a crimp feature configured to be crimped;
   a second sealing region adjacent the first sealing region, the second sealing region being configured to house a sealing component;

a flame path in a void between the second sealing region and the conduit, the flame path being created by an exertion of a compression force at the second sealing region; and an O-ring positioned within the longitudinal bore between the first and second sealing regions;

wherein the first and second sealing regions are configured to create an explosion proof seal around the end of the conduit.

2. The conduit fitting of claim 1, wherein the crimp feature is configured to bite into the end of the conduit when the first sealing region is compressed, and to both axially retain the end of the conduit within the conduit fitting and maintain a ground connection.

3. The conduit fitting of claim 2, wherein the crimping feature includes a plurality of teeth positioned on the interior portion of the first region.

4. The conduit fitting of claim 3, wherein the crimping feature axially retains the end of the conduit without requiring the ends of the conduit to be threaded.

5. The conduit fitting of claim 1, further comprising a sealant injection portion in the second region, and a weep port positioned opposite the injection port, the weep port providing a view of a void in the second region for an installer to visibly see whether the void is completely filled with the sealing component, and wherein the sealing component is a flowable epoxy.

6. A conduit fitting for a hazardous environment comprising:

a main body having a distal portion and a proximate portion, the main body including a longitudinal bore with openings at each of the distal portion and the proximate portion, the opening at the distal portion being configured to receive an end of a conduit;

a first sealing region including a crimp feature configured to be crimped and to bite into the end of the conduit when the first sealing region is compressed;

a second sealing region adjacent the first sealing region, the second sealing region being configured to house a sealing component;

a flame path in a void between the second sealing region and the conduit, the flame path being created by an exertion of a compression force at the second sealing region; and an O-ring positioned within the longitudinal bore of the conduit fitting and between the first and second sealing regions; and wherein the first and second sealing regions are configured to create an explosion proof seal around the end of the conduit.

7. The conduit fitting of claim 6, further comprising the sealing component, and wherein the sealing component is a pressure sensitive adhesive.

8. The conduit fitting of claim 6, further comprising a third sealing region including a crimp feature configured to be crimped; and a fourth sealing region adjacent the third sealing region, the fourth sealing region being configured to house a sealing component, wherein the first and second sealing regions are positioned at the distal portion of the main body, and wherein the third and fourth sealing regions are positioned at the proximate portion of the main body.

9. The conduit fitting of claim 8, wherein the crimp feature included in the third sealing region includes a plurality of teeth configured to bite into an end of a second conduit when the third sealing region is compressed.

10. The conduit fitting of claim 6, wherein the second sealing region includes a crimp feature.

11. The conduit fitting of claim 6, wherein the second sealing region includes a sealant injection portion.

12. The conduit fitting of claim 11, wherein the second sealing region includes a sealant weep port.

13. The conduit fitting of claim 6, wherein the crimping feature includes a plurality of teeth positioned on the interior portion of the conduit fitting, the plurality of teeth configured to bite into the end of the conduit when the first sealing region is compressed.

14. The conduit fitting of claim 6, wherein the crimping feature both axially retains a first end of the conduit within the conduit fitting and maintains a ground connection.

15. The conduit fitting of claim 6, further comprising the sealing component, and wherein the sealing component is a flowable epoxy.

16. The conduit fitting of claim 6, further comprising the sealing component, and wherein the sealing component is a heat activated thermoplastic.

17. The conduit fitting of claim 6, further comprising the sealing component, and wherein the sealing component is a two component epoxy.

18. The conduit fitting of claim 6, further comprising the sealing component, and wherein the sealing component is a pressure activated epoxy.

19. The conduit fitting of claim 6, further comprising the sealing component, and wherein the sealing component surrounds the flame path.

* * * * *